United States Patent
Konno et al.

(10) Patent No.: US 8,722,558 B2
(45) Date of Patent: May 13, 2014

(54) PROCESS FOR PRODUCING REGENERATED HYDROTREATING CATALYST AND PROCESS FOR PRODUCING PETROCHEMICAL PRODUCT

(75) Inventors: Souichirou Konno, Tokyo (JP); Yoshimu Iwanami, Tokyo (JP); Wataru Sahara, Tokyo (JP); Nobuharu Kimura, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 243 days.

(21) Appl. No.: 13/382,383

(22) PCT Filed: Jun. 18, 2010

(86) PCT No.: PCT/JP2010/060361
§ 371 (c)(1),
(2), (4) Date: Mar. 19, 2012

(87) PCT Pub. No.: WO2011/004690
PCT Pub. Date: Jan. 13, 2011

(65) Prior Publication Data
US 2012/0160738 A1    Jun. 28, 2012

(30) Foreign Application Priority Data
Jul. 9, 2009  (JP) .............................. P2009-162949

(51) Int. Cl.
*C10G 65/02*  (2006.01)
(52) U.S. Cl.
USPC ................................. 502/56; 502/20; 502/34
(58) Field of Classification Search
CPC ............ B01J 21/20; B01J 23/90; B01J 25/04; B01J 27/28; B01J 29/90; B01J 31/40; B01J 38/02
USPC ............................................... 502/20, 34, 56
See application file for complete search history.

(56) References Cited

U.S. PATENT DOCUMENTS

| | | | |
|---|---|---|---|
| 4,975,399 A * | 12/1990 | Gardner ........................... | 502/38 |
| 2006/0035779 A1 | 2/2006 | Hill et al. | |
| 2012/0078022 A1 | 3/2012 | Kimura et al. | |

FOREIGN PATENT DOCUMENTS

| | | |
|---|---|---|
| CN | 1705511 | 12/2005 |
| CN | 1832801 | 9/2006 |

(Continued)

OTHER PUBLICATIONS

Chinese Office Action in respect to Chinese Appl. No. 20108-0030840.2, dated Aug. 21, 2013.

(Continued)

*Primary Examiner* — Brian McCaig
(74) *Attorney, Agent, or Firm* — Greenblum & Bernstein, P.L.C.

(57) ABSTRACT

Provided is a process for producing a regenerated hydrotreating catalyst by regenerating a spent hydrotreating catalyst in a prescribed temperature range, wherein the prescribed temperature range is a temperature range of $T_1-30°$ C. or more and $T_2+30°$ C. or less, as determined by subjecting the spent hydrotreating catalyst to a differential thermal analysis, converting a differential heat in a measuring temperature range of 100° C. or more and 600° C. or less to a difference in electromotive force, differentiating the converted value twice by temperature to provide a smallest extreme value and a second smallest extreme value, and representing a temperature corresponding to the extreme value on the lower-temperature side as $T_1$ and a temperature corresponding to the extreme value on the higher-temperature side as $T_2$.

7 Claims, 5 Drawing Sheets

(56) References Cited

FOREIGN PATENT DOCUMENTS

| EP | 1920836 | 10/2006 |
|---|---|---|
| JP | 52-068890 | 6/1977 |
| JP | 03-068453 | 3/1991 |
| JP | 05-123586 | 5/1993 |
| JP | 2000-5609 | 1/2000 |
| JP | 2007-319844 | 12/2007 |
| WO | 2005-014168 | 2/2005 |

OTHER PUBLICATIONS

International Search Report for PCT/JP2010/060361 (English and Japanese), Mailing Date: Jul. 13, 2010.
English translation of International Preliminary Report on Patentability for PCT/JP2010/060361, Mailing Date: Feb. 23, 2012.

* cited by examiner

PROCESS FOR PRODUCING REGENERATED HYDROTREATING CATALYST AND PROCESS FOR PRODUCING PETROCHEMICAL PRODUCT

TECHNICAL FIELD

The present invention relates to a process for producing a regenerated hydrotreating catalyst for treating a distillate petroleum fraction and a process for producing a petroleum product made from a distillate petroleum fraction.

BACKGROUND ART

Sulfur-containing compounds, nitrogen-containing compounds, oxygen-containing compounds, and the like are contained in crude petroleum as impurities and these impurities are also contained in distillate petroleum fractions obtained by distilling the crude petroleum. The impurities in these distillate petroleum fractions are reduced in their contents by a step of bringing the fractions into contact with a catalyst having a hydrogenation activity in the presence of hydrogen, the step being referred to as hydrotreatment. Especially, desulfurization for reducing contents of the sulfur-containing compounds is well known. Recently, from the viewpoint of reducing environmental load, there has been stricter demand for controlling or reducing contents of the impurities including the sulfur-containing compounds in petroleum products, and a large number of petroleum products referred to as so-called "sulfur free" are manufactured.

After a hydrotreating catalyst used for hydrotreatment of the distillate petroleum fraction is used for a certain period of time, its activity lowers due to deposition of coke or sulfur components, and the like, and therefore, replacement is carried out. Especially, the "sulfur free" is required, and a greater hydrotreating capability is required in hydrotreating facilities for fractions such as kerosene, gas oil, and vacuum gas oil. As a result, frequency of the replacement of the catalyst is increased, which leads to an increase in catalyst cost and an increase in an amount of waste catalyst.

To combat this, a regenerated catalyst (regenerated hydrotreating catalyst) regenerated from a spent hydrotreating catalyst is partially used in these facilities (For example, see Patent Literatures 1 and 2).

CITATION LIST

Patent Literature

Patent Literature 1: Japanese Patent Application Laid-Open Publication No. 52-68890
Patent Literature 2: Japanese Patent Application Laid-Open Publication No. 05-123586

SUMMARY OF INVENTION

Technical Problem

In the use of the regenerated catalyst, if it is possible to maintain the activity of the hydrotreating catalyst even after hydrotreatment and regeneration are repeated multiple times, advantages of using the hydrotreating catalyst regenerated (hereinafter, referred to as "regenerated hydrotreating catalyst" or just as "regenerated catalyst") become greater. In conventional regeneration, it is possible to restore the activity by regeneration in viewpoint of the deposition of coke or sulfur which is the main cause of a decrease in the activity occurred in the use of the hydrotreating catalyst. However, the catalyst activity may be lowered because the regeneration itself changes a structure of an active metal supported on the catalyst or something like that. In addition, as the catalyst activity after regeneration varies depending on the usage history before regeneration of the catalyst, a method of regeneration, or the like, the regenerated catalyst, especially the regenerated catalyst after regenerated multiple times does not always have a sufficient activity steadily. Moreover, it may be necessary to select conditions of regeneration depending on the usage history of the spent catalyst or the like. Furthermore, when the activity is found to be low after packing the regenerated catalyst in the hydrotreating facilities and starting hydrotreating operation, there is a need for reduction of a treatment speed of a feed oil or the like, which presents a major problem.

For the reasons mentioned above, a real situation is that the regenerated catalyst is not necessarily employed in the hydrotreating facilities sufficiently. Therefore, it is strongly demanded that a decrease in the activity by regeneration of the hydrotreating catalyst be inhibited and a regenerated catalyst having a high activity steadily be provided.

The present invention has been made in view of the aforementioned circumstances, and an object of the present invention is to provide a process for producing a regenerated hydrotreating catalyst enabling production of a regenerated hydrotreating catalyst having a high activity steadily from a spent hydrotreating catalyst. Another object of the present invention is to provide an economically efficient process for producing a petroleum product by using the regenerated hydrotreating catalyst.

Solution to Problem

Aiming at solving the above problems, the present invention provides a process for producing a regenerated hydrotreating catalyst by regenerating a spent hydrotreating catalyst in a prescribed temperature range, wherein the prescribed temperature range is a temperature range of $T_1-30°$ C. or more and $T_2+30°$ C. or less, as determined by subjecting the spent hydrotreating catalyst to a differential thermal analysis, converting a differential heat in a measuring temperature range of 100° C. or more and 600° C. or less to a difference in electromotive force, differentiating the converted value twice by temperature to provide a smallest extreme value and a second smallest extreme value, and representing a temperature corresponding to the extreme value on the lower-temperature side as $T_1$ and a temperature corresponding to the extreme value on the higher-temperature side as $T_2$.

Here, "differential thermal analysis" is an analysis method of elevating a temperature of a sample under prescribed temperature conditions and measuring variations in the amount of heat accompanying gasification, oxidation, thermal decomposition, and the like. Specifically, for example, measurement is performed by measuring out about 5 mg of a sample into a platinum pan having an internal diameter of 5 mm, setting it in a differential thermal analyzer, and elevating a temperature of the sample from room temperature to 700° C. at 10° C./minute and a flow rate of air of 100 ml/minute.

Hereinafter, a description will be given of a calculation method of $T_1$ and $T_2$ based on FIGS. 1 to 5.

FIG. 1 is a chart representing a temperature range of 100° C. or more and 600° C. or less of results of a differential thermal analysis on a sample.

In this chart, two peaks (peak 1 and peak 2) are apparently observed; however, it is necessary to carry out the following processing in order to exactly obtain a temperature corresponding to an extreme value of the peak.

On the chart shown in FIG. 1, a value ($\Delta V/\Delta T$) obtained by dividing a difference ($\Delta V$) by a difference ($\Delta T$), the difference ($\Delta T$) being a difference between a measurement temperature and the next measurement temperature after elevating a temperature (for example, a temperature elevated by 0.1° C.) and the difference ($\Delta V$) being a difference between values obtained by converting differential heats at the measurement temperatures to differences in electromotive force, is calculated, and this calculation is repeated from 100° C. to 600° C., which provides a chart shown in FIG. 2.

Next, FIG. 3 is provided by averaging out values in a measurement temperature range including a temperature and ranging from the temperature −10° C. to the temperature +10° C., and a value of the ordinate in the chart is referred to as "a value obtained by converting a differential heat to a difference in electromotive force and differentiating the converted value by temperature".

Furthermore, FIGS. 4 and 5 are provided by performing the same processing as that mentioned above on the chart shown in FIG. 3. Here, a value of the ordinate in the chart shown in FIG. 5 is referred to as "a value obtained by converting a differential heat to a difference in electromotive force and differentiating the converted value twice by temperature". Of a smallest extreme value and a second smallest extreme value in this chart, a temperature corresponding to the extreme value on the lower-temperature side is represented as $T_1$ and a temperature corresponding to the extreme value on the higher-temperature side is represented as $T_2$.

$T_1$ and $T_2$ correspond to the peak 1 and the peak 2 in FIG. 1, respectively. In addition, $T_1$ is a benchmark of a temperature where a sulfide of an active metal such as molybdenum in the spent catalyst burns to turn into an oxide of the active metal and $T_2$ is a benchmark of a temperature where coke depositing on the spent catalyst burns.

In the process for producing a regenerated hydrotreating catalyst of the present invention, it is preferred that a residual carbon content in the regenerated hydrotreating catalyst be 0.2% by mass or more and 3.0% by mass or less.

In addition, in the process for producing a regenerated hydrotreating catalyst of the present invention, it is preferred that the hydrotreating catalyst be a catalyst obtained by supporting 10 to 30% by mass of at least one selected from Group 6 metals of the periodic table and 1 to 7% by mass of at least one selected from Group 8 to 10 metals of the periodic table, based on a total mass of the catalyst, on an inorganic support comprising an oxide of aluminum.

Moreover, in the process for producing a regenerated hydrotreating catalyst of the present invention, it is preferred that the at least one selected from Group 6 metals of the periodic table be molybdenum, and the at least one selected from Group 8 to 10 metals of the periodic table be cobalt and/or nickel.

Furthermore, in the process for producing a regenerated hydrotreating catalyst of the present invention, it is preferred that the spent hydrotreating catalyst be regenerated under an air flow having a flow rate per unit volume of the catalyst of from 20 to 2000 NL/h·L-catalyst for 2 hours or more. In the units, "NL" means a flow rate of air in a standard condition, "h" means hour, and "L-catalyst" means a volume of the catalyst.

The present invention provides a process for producing a petroleum product, comprising: a first step of producing a regenerated hydrotreating catalyst by the process for producing a regenerated hydrotreating catalyst of the present invention; and a second step of hydrotreating a distillate petroleum fraction by using the regenerated hydrotreating catalyst obtained in the first step.

In the process for producing a petroleum product of the present invention, it is preferred that operating conditions of the second step be a hydrogen partial pressure of from 3 to 13 MPa, a LHSV of from 0.05 to 5 h$^{-1}$, a reaction temperature of from 200° C. to 410° C., a ratio of hydrogen/oil of from 100 to 8000 SCF/BBL, and distillation properties of a feed oil of 150° C. or more and 600° C. or less.

The present invention also provides a regenerated hydrotreating catalyst produced by the process for producing a regenerated hydrotreating catalyst of the present invention.

Advantageous Effects of Invention

The process for producing a regenerated hydrotreating catalyst of the present invention has an advantage of being capable of easily producing a regenerated hydrotreating catalyst having a sufficient activity. In addition, the process for producing a petroleum product of the present invention can achieve a highly practical producing process using a regenerated hydrotreating catalyst having a sufficient activity with a lower price and is remarkably useful in terms of reduction of cost, reduction of an emission amount of waste product, efficiency in hydrotreatment of a distillate petroleum fraction, production of a petroleum product with higher quality, and so on.

DESCRIPTION OF EMBODIMENTS

Figure 1:
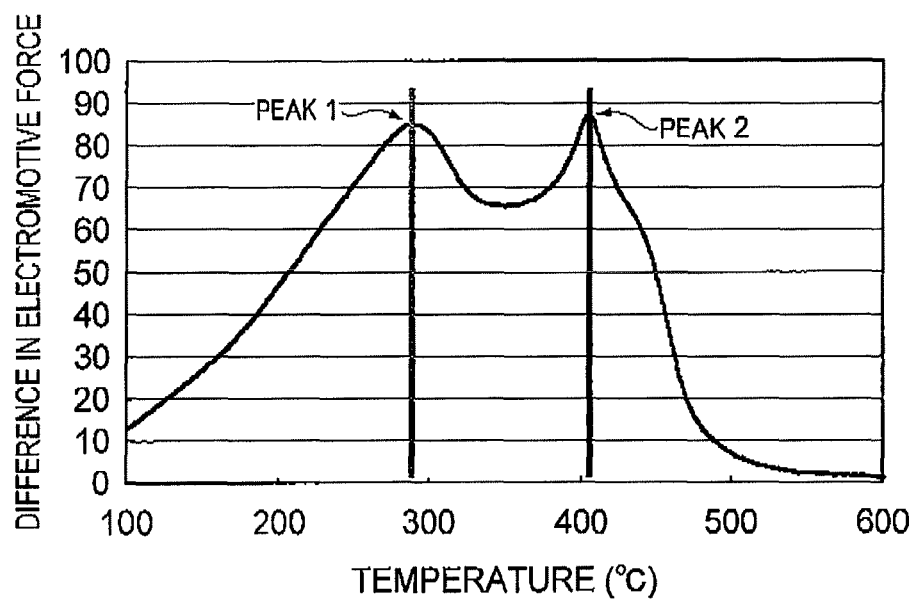
FIG. 1 is a view for explaining a calculation method of $T_1$ and $T_2$.
Figure 2:
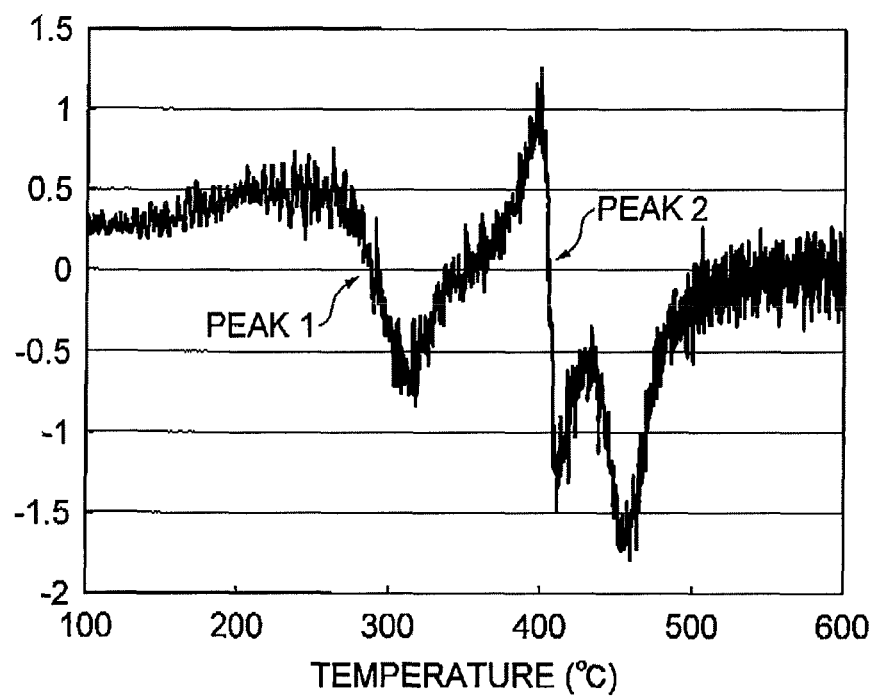
FIG. 2 is a view for explaining a calculation method of $T_1$ and $T_2$.
Figure 3:
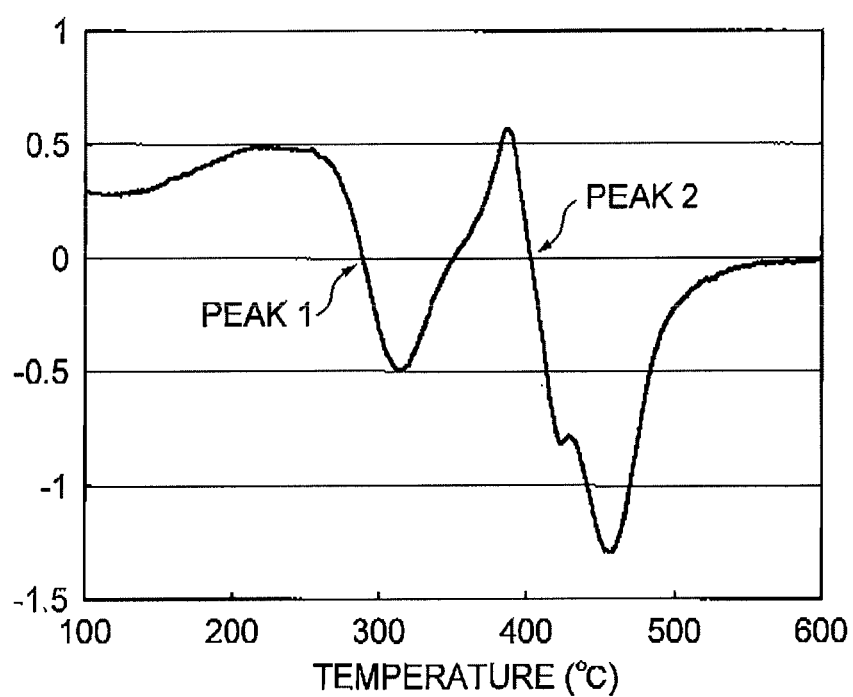
FIG. 3 is a view for explaining a calculation method of $T_1$ and $T_2$.
Figure 4:
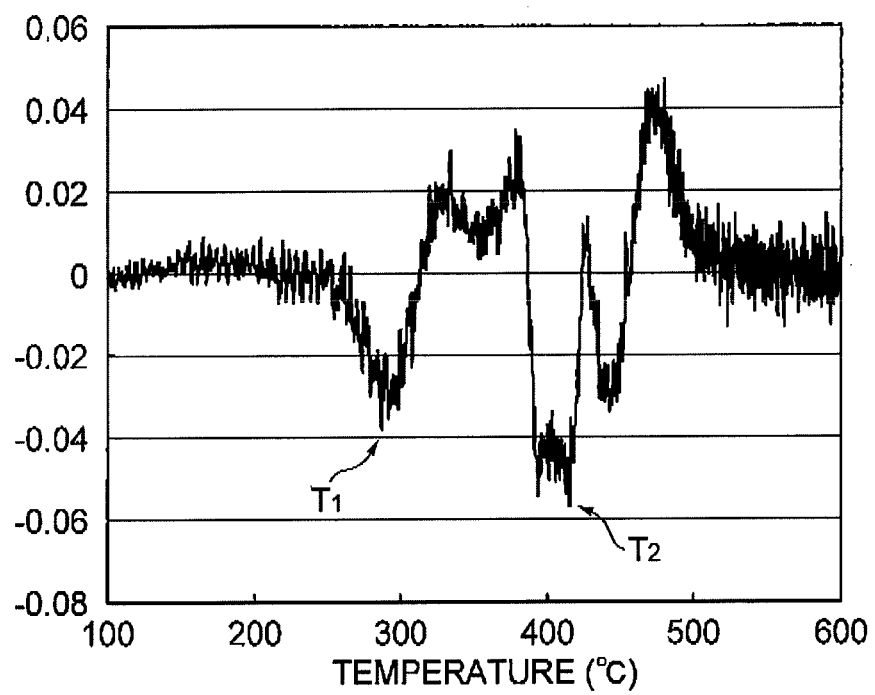
FIG. 4 is a view for explaining a calculation method of $T_1$ and $T_2$.
Figure 5:
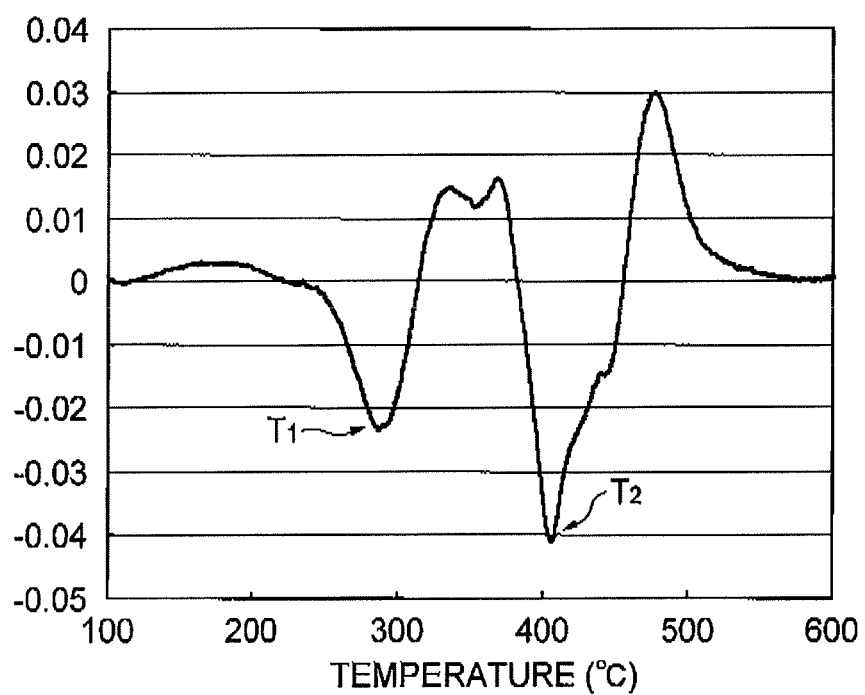
FIG. 5 is a view for explaining a calculation method of $T_1$ and $T_2$.

Hereinafter, a detailed description will be given of preferred embodiments of the present invention.

(Hydrotreating Catalyst)

A hydrotreating catalyst used in the present invention preferably comprises at least one of Group 6 metals of the periodic table and at least one of Group 8 to 10 metals as active metals. Examples of the Group 6 metals of the periodic table preferably include molybdenum, tungsten, and chrome, more preferably include molybdenum and tungsten, and especially preferably include molybdenum. Examples of the Group 8 to 10 metals of the periodic table preferably include iron, cobalt, and nickel, more preferably include cobalt and nickel, and especially preferably include cobalt. These metals can be used alone or in combination of two or more. Preferred examples of a specific combination of the metals to be used include molybdenum-cobalt, molybdenum-nickel, tungsten-nickel, molybdenum-cobalt-nickel, and tungsten-cobalt-nickel. The periodic table herein means a long form periodic table provided by International Union of Pure and Applied Chemistry (IUPAC).

The hydrotreating catalyst according to the present invention is preferably a catalyst in which the metals are supported on an inorganic support comprising an oxide of aluminum.

Preferred examples of the inorganic support comprising an oxide of aluminum include alumina, alumina-silica, alumina-boria, alumina-titania, alumina-zirconia, alumina-magnesia, alumina-silica-zirconia, alumina-silica-titania, or a support in which a porous inorganic compound such as various clay minerals including various zeolites, sepiolite, and montmorillonite is added to alumina, and of these, alumina is especially preferred.

The hydrotreating catalyst according to the present invention is preferably a catalyst obtained by supporting 10 to 30% by mass of the at least one selected from Group 6 metals of the periodic table and 1 to 7% by mass of the at least one selected from Group 8 to 10 metals of the periodic table, based on a total mass of the catalyst, on the inorganic support comprising an oxide of aluminum. When supported amounts of the Group 6 metals of the periodic table and the Group 8 to 10 metals of the periodic table are less than their own lower limits, the catalyst tends not to exert a sufficient hydrotreating activity, and on the other hand, when the supported amounts exceed their own upper limits, catalyst cost increases, and the catalyst tends not to exert a sufficient hydrotreating activity because agglomeration of the supported metal is likely to occur.

Examples of a precursor of the metal species used in supporting the metal on the inorganic support include, but are not limited to, inorganic salts of the metals and organic metal compounds, and preferably include water-soluble inorganic salts. In a supporting step, it is preferred to carry out supporting by using a solution, preferably an aqueous solution, of the precursor of the metal. As supporting operation, for example, a known method such as an immersion method, an impregnation method, and a coprecipitation method is preferably employed.

It is preferred that the support on which the precursor of the metal is supported be calcined preferably in the presence of oxygen after dried to once convert the metal species to an oxide. Furthermore, before hydrotreating a distillate petroleum fraction, it is preferred to convert the metal species to a sulfide by a sulfiding process referred to as "pre-sulfiding".

(Regeneration Step)

The hydrotreating catalyst which has been used at a hydrotreating facility for a distillate petroleum fraction for a certain period of time and then represents the activity lower than a certain level is subjected to regeneration. A preferred example of a facility for carrying out the regeneration includes, but is not especially limited to, a facility different from the hydrotreating facility for a distillate petroleum fraction. Specifically, the regeneration is not carried out with keeping the catalyst packed into a reactor of the hydrotreating facility for a distillate petroleum fraction; it is preferred to pull out the catalyst from the reactor, move the pulled-out catalyst to a facility for regeneration, and carry out the regeneration at the facility.

A procedure for carrying out the regeneration of the spent catalyst used in the present invention, but is not limited, preferably comprises, in the following order, a step of removing, by sieving, a pulverized catalyst from the spent catalyst, and optionally components other than the catalyst, such as a filler, a step of removing oil attached to the spent catalyst (deoiling step), and a step of removing coke, sulfur components, and the like depositing on the spent catalyst (regeneration step).

Of these, as the deoiling step, a method of volatilizing the oil components by heating the spent catalyst in an atmosphere where oxygen is not substantially present, for example, in a nitrogen atmosphere, or the like is preferably employed. The conditions preferably include, for example, heating at a temperature of from about 300° C. to 400° C. and a flow rate of nitrogen in terms of a flow rate per unit volume of the catalyst of from 5 to 150 NL/h·L-catalyst for 3 to 7 hours. Alternatively, the deoiling step may be conducted by a method of cleaning the oil components by light hydrocarbons, a method of removing the oil components by steaming, or the like.

When the regeneration is carried out in an air flow, a flow rate of air in terms of a flow rate per unit volume of the spent catalyst is preferably from 20 to 2000 NL/h·L-catalyst, more preferably from 30 to 1000 NL/h·L-catalyst, and especially preferably from 40 to 500 NL/h·L-catalyst. When the flow rate is less than 20 NL/h·L-catalyst, there is a tendency that coke, sulfur components, or the like depositing on the spent catalyst is not removed sufficiently and the activity of a regenerated catalyst is not improved sufficiently. On the other hand, when the flow rate exceeds 2000 NL/h·L-catalyst, there is a need to increase a size of a compressor, which impairs economic efficiency.

In the regeneration step, the regeneration is carried out at a temperature of $T_1-30°$ C. or more and $T_2+30°$ C. or less. The lower limit of the temperature of the regeneration is $T_1-30°$ C. or more, preferably $T_1-20°$ C. or more, and especially preferably $T_1-10°$ C. or more in order to convert the active metal having a sulfide state in the spent catalyst back to an oxide state. On the other hand, the lower limit of the temperature of the regeneration is $T_2+30°$ C. or less, preferably $T_2+20°$ C. or less, and especially preferably $T_2+10°$ C. or less because the activity of the regenerated catalyst decreases if coke depositing on the catalyst is burned and removed completely.

The time of the regeneration is preferably 2 hours or more, more preferably 2.5 hours or more, and especially preferably 3 hours or more. When the treatment time is less than 2 hours, removal of substances which have reduced the catalyst activity, such as coke and sulfur components, tends not to proceed efficiently. It is noted that "coke" in the present application means a substance in which a hydrocarbon depositing on a surface of the hydrotreating catalyst in the use of the hydrotreating catalyst is highly cyclized and condensed and which is similar in appearance to carbon.

The regenerated hydrotreating catalyst obtained in the regeneration step contains residual carbon at a content with a lower limit preferably of 0.2% by mass or more, more preferably of 0.4% by mass or more, and especially preferably of 0.5% by mass or more, and with an upper limit preferably of 3.0% by mass or less, more preferably of 2.5% by mass or less, and especially preferably of 2.0% by mass or less based on a mass of the regenerated hydrotreating catalyst. When the residual carbon content is less than 0.2% by mass or exceeds 3.0% by mass, the hydrotreating activity of the regenerated catalyst tends to be not high enough. It is noted that "residual carbon" in the present application means carbon (coke) remaining in the regenerated catalyst after regenerating the spent hydrotreating catalyst, and the residual carbon content in the regenerated hydrotreating catalyst is measured in accordance with "Coal and coke—Mechanical methods for ultimate analysis" defined in JIS M 8819.

It is noted that a step of producing a regenerated hydrotreating catalyst in the process for producing a petroleum product of the present invention is a step of producing a regenerated hydrotreating catalyst by the process for producing a regenerated hydrotreating catalyst of the present invention, and includes the aforementioned steps. Aspects of a hydrotreating catalyst and a regeneration step in the process for producing a petroleum product of the present invention are the same as those mentioned above, and the overlapping explanation will be omitted here.

(Hydrotreatment Step)

In a hydrotreatment step of a distillate petroleum fraction of the present invention, it is preferred to convert the active metal species into a metal sulfide by subjecting the regenerated catalyst packed in the facility to a treatment of the catalyst using a sulfur compound referred to as pre-sulfiding before a hydrotreatment reaction.

There is no particular restriction on conditions of the pre-sulfiding, but it is preferred to add a sulfur compound to a feed oil used for the hydrotreatment of a distillate petroleum fraction and bring it into contact with the regenerated catalyst continuously under conditions of a temperature of from 200 to 380° C., a LHSV of from 1 to 2 h$^{-1}$, a pressure same as that in operation of the hydrotreatment, and a treatment time of 48 hours or more. Examples of the sulfur compound added to the feed oil preferably include, but are not limited to, dimethyl disulfide (DMDS) and hydrogen sulfide, and it is preferred to add about 1% by mass of these compounds to the feed oil based on a mass of the feed oil.

Operating conditions in the aforementioned hydrotreatment step of a distillate petroleum fraction are not especially limited, but it is preferred not to add a sulfur compound in particular because it is generally possible to keep the active metal species of the catalyst in the sulfide state by the sulfur compound already contained in the feed oil, while a small amount of a sulfur compound such as DMDS may be added to the feed oil in order to keep the active metal species of the catalyst in the sulfide state.

A hydrogen partial pressure at an inlet of a reactor in the hydrotreatment step is preferably from 3 to 13 MPa, more preferably from 3.5 to 12 MPa, and especially preferably from 4 to 11 MPa. When the hydrogen partial pressure is less than 3 MPa, there is a tendency that generation of coke on the catalyst becomes intense and a life-span of the catalyst becomes shortened. On the other hand, when the hydrogen partial pressure exceeds 13 MPa, there is a fear that construction cost of the reactor, surrounding equipment, and the like increases and economical efficiency is impaired.

A LHSV in the hydrotreatment step can range preferably from 0.05 to 5 h$^{-1}$, more preferably from 0.1 to 4.5 h$^{-1}$, and especially preferably from 0.2 to 4 h$^{-1}$. When the LHSV is less than 0.05 h$^{-1}$, there is a fear that the construction cost of the reactor becomes excessive and the economical efficiency is impaired. On the other hand, when the LHSV exceeds 5 h$^{-1}$, there is a fear that the hydrotreatment of the feed oil is not achieved sufficiently.

A temperature of a hydrogenation reaction in the hydrotreatment step is preferably from 200° C. to 410° C., more preferably from 220° C. to 400° C., and especially preferably from 250° C. to 395° C. When the reaction temperature is less than 200° C., the hydrotreatment of the feed oil tends not to be achieved sufficiently. On the other hand, the case where the reaction temperature exceeds 410° C. is undesirable because, if so, generation of a gas component which is a by-product increases, and therefore, yield of an objective refined oil decreases.

A ratio of hydrogen/oil in the hydrotreatment step is preferably from 100 to 8000 SCF/BBL, more preferably from 120 to 7000 SCF/BBL, and especially preferably from 150 to 6000 SCF/BBL. When the ratio of hydrogen/oil is less than 100 SCF/BBL, there is a tendency that generation of coke on the catalyst at an outlet of the reactor progresses and the life-span of the catalyst becomes shortened. On the other hand, when the ratio of hydrogen/oil exceeds 8000 SCF/BBL, there is a fear that construction cost of a recycle compressor becomes excessive and the economical efficiency is impaired.

A reaction style in the hydrotreatment step is not especially limited, but can be generally selected from various processes such as fixed bed and moving bed, and the fixed bed is preferred. In addition, the reactor is preferred to be tower shaped.

As the feed oil subjected to the hydrotreatment of a distillate petroleum fraction of the present invention, a feed oil having a distillation temperature by a distillation test preferably of from 130 to 600° C., more preferably of from 140 to 550° C., and especially preferably of from 150 to 500° C. is used. When a feed oil having a distillation temperature of less than 130° C. is used, there is a tendency that the hydrotreatment reaction becomes a gas-phase reaction and the aforementioned catalyst does not exert its performance sufficiently. On the other hand, when a feed oil having a distillation temperature of more than 600° C. is used, a content of a poisoning substance to the catalyst such as a heavy metal contained in the feed oil becomes larger and the life-span of the catalyst decreases remarkably. There is no particular restriction on other properties of the distillate petroleum fraction used as the feed oil, but typical properties are that a density at 15° C. is from 760.0 to 970.0 kg/m$^3$ and a sulfur component content is from 0.02 to 4.0% by mass.

It is noted that the sulfur content in the present invention means a sulfur content measured in accordance with "6. Energy-dispersive X-ray fluorescence method" in "Crude oil and petroleum products—Determination of sulfur content" defined in JIS K 2541-1992. In addition, the distillation test in the present application means a test performed in accordance with "6. Determination of vacuum distillation characteristics" in "Petroleum products—Determination of distillation characteristics" defined in JIS K 2254. Moreover, the density of a distillate petroleum fraction in the present application means a density measured in accordance with "5. Oscillating density test method" in "Crude petroleum and petroleum products—Determination of density and petroleum measurement tables based on a reference temperature (15 centigrade degrees) (excerpt)" defined in JIS K 2249.

Furthermore, an example of means of directly evaluating the hydrotreating activity of the regenerated catalyst includes a desulfurization rate constant under an identical operating condition. The desulfurization rate constant is defined by the following formula.

Desulfurization rate constant=LHSV×(1/sulfur content in product oil−1/sulfur content in feed oil)

It is noted that the activity of a new catalyst varies with its manufacturer, its production unit, and the like, and therefore, it is considered valid to evaluate the activity of the regenerated catalyst obtained by regenerating a hydrotreating catalyst after using the hydrotreating catalyst by relative activity based on the activity of a corresponding new catalyst. Then, the activity of the regenerated catalyst is evaluated by specific activity defined by the following formula.

Specific activity=desulfurization rate constant of regenerated catalyst/desulfurization rate constant of new catalyst

EXAMPLES

Next, a further detailed description will be given of the present invention with reference to Examples and Comparative Examples, but it should be construed that the invention is in no way limited to those examples.

Example 1

Regenerated Hydrotreating Catalyst

A spent hydrotreating catalyst 1 which was a catalyst containing molybdenum and cobalt as active metals supported on an alumina support and was pulled out after having been used in a hydrotreating facility for kerosene for two years was prepared. 5.139 mg of the spent hydrotreating catalyst 1 was measured out into a platinum pan, set in a differential thermal analyzer (Thermo Plus 2 series/TG8110 manufactured by Rigaku Corporation), and subjected to a differential thermal analysis with elevating a temperature of a sample from room temperature to 700° C. by 10° C./minute at a flow rate of air of 100 ml/minute. Next, $T_1$ and $T_2$ were calculated by the aforementioned method based on the results of the differential thermal analysis, which revealed that $T_1=260°$ C. and $T_2=360°$ C. Deoiling was carried out by heating the spent hydrotreating catalyst 1 at 300° C. for 3 hours in a nitrogen flow having a flow rate per unit volume of the spent catalyst of 15 NL/h·L-catalyst in an electric furnace. After that, a regenerated catalyst 1 was obtained by regenerating the deoiled catalyst at $T_1+40°$ C. for 5 hours in an air flow having a flow rate per unit volume of the catalyst of 50 NL/h·L-catalyst in the electric furnace. Quantitative determination of a residual carbon content in the obtained regenerated catalyst 1 was carried out by the aforementioned test method. As a result, the residual carbon content was 0.7% by mass based on the mass of the regenerated catalyst.

(Hydrotreatment Reaction)

The regenerated catalyst 1 was packed in a fixed-bed continuous flow reactor, and at first, pre-sulfiding of the catalyst was carried out. Specifically, 1% by mass of LAMS was added to a fraction corresponding to a gas oil having a density of 851.6 kg/m³, a initial boiling point of 231.0° C. and an end boiling point of 376.0° C. at a distillation test, and a sulfur component in terms of a sulfur atom based on a mass of a feed oil of 1.18% by mass, based on the mass of the fraction, and then, this was continuously supplied to the catalyst for 48 hours. After that, a hydrotreatment reaction was conducted by using the fraction corresponding to a gas oil as a feed oil under the conditions of a reaction temperature of 380° C., a hydrogen partial pressure of 6 MPa, a LHSV of 1 h$^{-1}$, and a ratio of hydrogen/oil of 1000 SCF/BBL. A desulfurization rate constant was obtained based on a sulfur component content in a product oil. In addition, a desulfurization rate constant was obtained by carrying out a similar reaction by using a new catalyst corresponding to the spent catalyst used, and the specific activity of the regenerated catalyst 1 was calculated by the desulfurization rate constant. The results are shown in Table 1. It is noted that the analysis on properties of the feed oil and the product oil was all conducted by the aforementioned test method.

Example 2

Regenerated Hydrotreating Catalyst

A regenerated catalyst 2 was obtained by using the same spent hydrotreating catalyst 1 as that used in Example 1 and by carrying out regeneration by the same operation as that in Example 1 except that regeneration conditions were those shown in Table 1. The analysis results of a residual carbon content in the regenerated catalyst 2 are shown in Table 1.

(Hydrotreatment Reaction)

A hydrotreatment reaction was carried out by the same operation as that in Example 1 except that the regenerated catalyst 2 was used. The results of specific activity are shown in Table 1.

Example 3

Regenerated Hydrotreating Catalyst

A spent hydrotreating catalyst 2 which was a catalyst containing molybdenum and cobalt as active metals supported on an alumina support and was pulled out after having been used in a hydrotreating facility for a gas oil for two years was prepared. The spent hydrotreating catalyst 2 was subjected to a differential thermal analysis, which revealed that $T_1=310°$ C. and $T_2=410°$ C. Deoiling was carried out by heating the spent hydrotreating catalyst 2 at 400° C. for 3 hours in a nitrogen flow having a flow rate per unit volume of the spent catalyst of 15 NL/h·L-catalyst in an electric furnace. After that, a regenerated catalyst 3 was obtained by regenerating the deoiled catalyst at $T_2-10°$ C. for 5 hours in an air flow having a flow rate per unit volume of the catalyst of 50 NL/h·L-catalyst in the electric furnace. Quantitative determination of a residual carbon content in the obtained regenerated catalyst 1 was carried out by the aforementioned test method. As a result, the residual carbon content was 0.3% by mass based on the mass of the regenerated catalyst.

(Hydrotreatment Reaction)

A hydrotreatment reaction was carried out by the same operation as that in Example 1 except that the regenerated catalyst 3 was used. The results of specific activity are shown in Table 1.

Example 4

Regenerated Hydrotreating Catalyst

A regenerated catalyst 4 was obtained by using the same spent hydrotreating catalyst 2 as that used in Example 3 and by carrying out regeneration by the same operation as that in Example 1 except that regeneration conditions were those shown in Table 1. The analysis results of a residual carbon content in the regenerated catalyst 4 are shown in Table 1.

(Hydrotreatment Reaction)

A hydrotreatment reaction was carried out by the same operation as that in Example 1 except that the regenerated catalyst 4 was used. The results of specific activity are shown in Table 1.

Comparative Examples 1 to 4

Regenerated Hydrotreating catalyst

Regenerated catalysts 5 to 8 were obtained by using the same spent hydrotreating catalysts 1 and 2 as those used in Examples 1 and 3 and by carrying out regeneration by the same operation as that in Example 1 except that regeneration conditions were those shown in Table 1. The analysis results of residual carbon contents in the regenerated catalysts 5 to 8 are shown in Table 1.

(Hydrotreatment Reaction)

Hydrotreatment reactions were carried out by the same operation as that in Example 1 except that the regenerated catalysts 5 to 8 were used respectively. The results of specific activity are shown in Table 1.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Spent hydrotreating catalyst | | Spent catalyst 1 | Spent catalyst 1 | Spent catalyst 2 | Spent catalyst 2 | Spent catalyst 1 | Spent catalyst 1 | Spent catalyst 2 | Spent catalyst 2 |
| Regenerated catalyst name | | Regenerated catalyst 1 | Regenerated catalyst 2 | Regenerated catalyst 3 | Regenerated catalyst 4 | Regenerated catalyst 5 | Regenerated catalyst 6 | Regenerated catalyst 7 | Regenerated catalyst 8 |
| Regeneration conditions | $T_1$ (°C.) | 260 | 260 | 310 | 310 | 260 | 260 | 310 | 350 |
|  | $T_2$ (°C.) | 360 | 360 | 410 | 410 | 360 | 360 | 410 | 410 |
|  | Regeneration temperature (°C.) | 300 ($T_1+40$) ($T_2-60$) | 350 ($T_1+90$) ($T_2-10$) | 400 ($T_1+90$) ($T_2-10$) | 420 ($T_1+110$) ($T_2+10$) | 400 ($T_1+140$) ($T_2+40$) | 195 ($T_1-65$) ($T_2-165$) | 500 ($T_1+190$) ($T_2+90$) | 300 ($T_1-50$) ($T_2-110$) |
|  | Flow rate of air (NL/h · L-catalyst) | 50 | 45 | 50 | 150 | 50 | 28 | 45 | 50 |
|  | Time (h) | 5 | 6 | 8 | 7 | 8 | 1 | 6 | 5 |
| Properties of regenerated catalyst | Residual carbon content (% by mass) | 0.7 | 0.5 | 0.3 | 0.2 | 0.1 | 2.2 | 0.05 | 3.5 |
| Specific activity (new catalyst: 1) | | 0.981 | 0.972 | 0.964 | 0.969 | 0.856 | 0.890 | 0.870 | 0.865 |

The results in Table 1 show that the residual carbon content is less than 2.0% by mass and the activity is maintained to be about 95% or more in comparison with the new catalyst when the spent hydrotreating catalyst is regenerated at a temperature of $T_1-30°$ C. or more and $T_2+30°$ C. or less according to the method of the present invention (Examples 1 to 4). On the other hand, in Comparative Examples 5 to 8, the activity in comparison with the new catalyst is about 89% or less and a decrease in the activity is large in each case, while the same feeding oils as those used in Examples 1 to 4 are hydrotreated.

The invention claimed is:

1. A process for producing a regenerated hydrotreating catalyst comprising
regenerating a spent hydrotreating catalyst in a prescribed temperature range, wherein the prescribed temperature range is a temperature range of $T_1-30°$ C. or more and $T_2+30°$ C. or less, as determined by subjecting the spent hydrotreating catalyst to a differential thermal analysis,
converting a differential heat in a measuring temperature range of 100° C. or more and 600° C. or less to a difference in electromotive force,
differentiating the converted value twice by temperature to provide a smallest extreme value and a second smallest extreme value, and
representing a temperature corresponding to the extreme value on the lower-temperature side as $T_1$ and a temperature corresponding to the extreme value on the higher-temperature side as $T_2$.

2. The process for producing a regenerated hydrotreating catalyst according to claim 1, wherein a residual carbon content in the regenerated hydrotreating catalyst is 0.2% by mass or more and 3.0% by mass or less.

3. The process for producing a regenerated hydrotreating catalyst according to claim 1, wherein the hydrotreating catalyst is a catalyst obtained by supporting 10 to 30% by mass of at least one selected from Group 6 metals of the periodic table and 1 to 7% by mass of at least one selected from Group 8 to 10 metals of the periodic table, based on a total mass of the catalyst, on an inorganic support comprising an oxide of aluminum.

4. The process for producing a regenerated hydrotreating catalyst according to claim 3, wherein the at least one selected from Group 6 metals of the periodic table is molybdenum, and the at least one selected from Group 8 to 10 metals of the periodic table is cobalt and/or nickel.

5. The process for producing a regenerated hydrotreating catalyst according to claim 1, wherein the spent hydrotreating catalyst is regenerated under an air flow having a flow rate per unit volume of the catalyst of from 20 to 2000 NL/h·L-catalyst for 2 hours or more.

6. A process for producing a petroleum product, comprising:
a first step of producing a regenerated hydrotreating catalyst by the process for producing a regenerated hydrotreating catalyst according to claim 1; and
a second step of hydrotreating a distillate petroleum fraction by using the regenerated hydrotreating catalyst obtained in the first step.

7. The process for producing a petroleum product according to claim 6, wherein operating conditions of the second step are a hydrogen partial pressure of from 3 to 13 MPa, a LHSV of from 0.05 to 5 $h^{-1}$, a reaction temperature of from 200° C. to 410° C., a ratio of hydrogen/oil of from 100 to 8000 SCF/BBL, and distillation properties of a feed oil of 150° C. or more and 600° C. or less.

* * * * *